H. E. COLEY AND D. H. DICKSON.
GAS BURNER.
APPLICATION FILED MAR. 1, 1922.
1,436,383.
Patented Nov. 21, 1922.
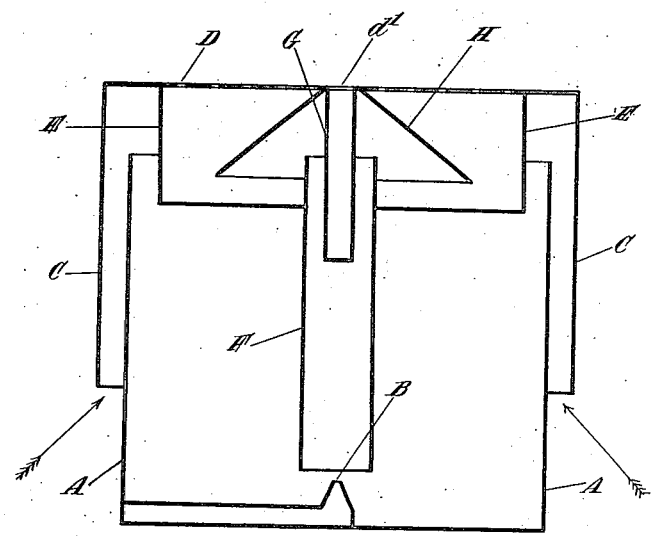

Patented Nov. 21, 1922.

1,436,383

UNITED STATES PATENT OFFICE.

HENRY EDWIN COLEY, OF TEMPLE, AND DESMOND HENRY DICKSON, OF MAIDA VALE, LONDON, ENGLAND, ASSIGNORS TO THE G. B. DEVELOPMENT SYNDICATE LIMITED, OF LONDON, ENGLAND.

GAS BURNER.

Application filed March 1, 1922. Serial No. 540,265.

*To all whom it may concern:*

Be it known that we, HENRY EDWIN COLEY and DESMOND HENRY DICKSON, both subjects of the King of Great Britain, residing, respectively, at 1 Paper Buildings, Temple, in the county of London, England, and 233 Elgin Avenue, Maida Vale, in the county of London, England, have invented certain new and useful Improvements in or Relating to Gas Burners, of which the following is a specification.

This invention relates to gas burners and more particularly to gas burners for cooking purposes, the object of the invention being to ensure complete combustion of the gas and to increase the heat of the flame.

In accordance with the invention we provide a gas burner in which the air for combustion is entrained on all sides of the jet of gas issuing from the hole or holes in a nipple, the air and gas being partially mixed in a mixing tube above said nipple, and a portion of the partially mixed air and gas is passed directly to the combustion surface, while the remainder passes into a mixing chamber, in which thorough mixing is effected, and thence passes through perforations in the upper or combustion surface of the mixing chamber. An important feature of the invention resides in the arrangement whereby the air delivered to the gas jet is, before reaching it, brought into contact with the heated surface of the mixing chamber, thereby becoming preheated.

In order that the said invention may be clearly understood and readily carried into effect, the same will now be described more fully with reference to the accompanying diagram illustrating in vertical section an embodiment of the invention.

A indicates an open-topped box or casing in the centre of which is a gas jet nipple B. Over the box A is placed a cover C which is supported and spaced from the box A by suitable means (not shown). The cover C comprises a perforated burner plate D below which is a mixing chamber E into which enters a mixing tube F suspended above the nipple B. A smaller tube G pendent from the plate D enters for some distance into the upper part of the tube F, and at the top of this tube G is the central perforation $d'$ of the burner plate D. Outside the tube G is a conical deflector H. The air enters between the walls of the box A and the downwardly extending flange of the cover C, thence passes in contact with the hot mixing chamber and down to the inlet of the tube F, in ascending which tube it is first mixed with the gas from the nipple B. The main portion of the mixture passing out at the top of the tube F impinges on the deflector H and becomes thoroughly mixed in the chamber E, whence it passes through the perforated burner plate D, but a smaller portion of the mixture passes directly through the tube G and the perforation $d'$, where it is ignited. It is found in practice that the mixture thus supplied directly to the centre of the burner plate contains more air than is necessary for its complete combustion, but the flame thus provided in the centre of the combustion surface prevents a comparatively cold centre of the flame being established, and the excess air passing through the said small tube mixes with the flames from the surrounding perforations, encouraging combustion and increasing the temperature of the flame generally.

What we claim and desire to secure by Letters Patent of the United States is:—

1. A gas burner in which the air for combustion is entrained on all sides of the jet of gas issuing from a nipple, the air and gas being partially mixed in a mixing tube above said nipple, and a portion of the partially mixed air and gas is passed directly to the combustion surface, while the remainder passes into a mixing chamber in which thorough mixing is effected and thence passes through perforations in the upper or combustion surface of the mixing chamber.

2. A gas burner in which a mixing tube is supported above a gas nipple, so that air for combustion entrained on all sides of the jet of gas issuing from said nipple and the said air and gas are partially mixed in the said tube, into which tube enters a smaller tube for conveying a portion of such partially mixed air and gas directly to the combustion surface, and a conical deflector surrounding said smaller tube diverts the remainder of such air and gas into a mixing chamber in which thorough mixing is effected, the mixture then passing through perforations in the upper or combustion surface of the mixing chamber.

3. A gas burner as in claim 1 in which the air for combustion is, before reaching the gas jet, brought into contact with the heated surface of the mixing chamber, thereby becoming preheated.

HENRY EDWIN COLEY.
DESMOND HENRY DICKSON.